United States Patent
Rajput et al.

(10) Patent No.: US 11,458,430 B2
(45) Date of Patent: Oct. 4, 2022

(54) FLUSH VALVE, DUST COLLECTOR AND DUST COLLECTION SYSTEM

(71) Applicant: ATLAS COPCO AIRPOWER, NAAMLOZE VENNOOTSCHAP, Wilrijk (BE)

(72) Inventors: Prashant K. Rajput, Maharashtra (IN); Vishal Krishnarao Patil, Maharashtra (IN); Vijay Sohanlal Sharma, Maharashtra (IN); Srinivasan Venkataramani Arjune, Tamil Nadu (IN)

(73) Assignee: ATLAS COPCO AIRPOWER, NAAMLOOZE VENNOOTSCHAP, Wilrijk (BE)

( * ) Notice: Subject to any disclaimer, the term of this patent is extended or adjusted under 35 U.S.C. 154(b) by 269 days.

(21) Appl. No.: 17/037,801

(22) Filed: Sep. 30, 2020

(65) Prior Publication Data
US 2021/0138384 A1   May 13, 2021

(30) Foreign Application Priority Data

Oct. 7, 2019 (IN) .............................. 201921040596
Dec. 31, 2019 (CN) .......................... 201911418271.8
Dec. 31, 2019 (CN) .......................... 201922499288.2

(51) Int. Cl.
*B01D 46/42* (2006.01)
*F16K 3/28* (2006.01)
(Continued)

(52) U.S. Cl.
CPC ..... *B01D 46/4272* (2013.01); *B01D 35/1573* (2013.01); *B01D 46/446* (2013.01);
(Continued)

(58) Field of Classification Search
CPC ............ B01D 46/2411; B01D 46/4272; B01D 46/446; B01D 46/71; B01D 46/4281;
(Continued)

(56) References Cited

U.S. PATENT DOCUMENTS 2,182,165 A   12/1939 Smith
2,975,847 A   3/1961 Feucht
(Continued)

FOREIGN PATENT DOCUMENTS

DE   102015005414 A1   11/2016
WO   2014070063 A1   5/2014

*Primary Examiner* — Gabriel E Gitman
(74) *Attorney, Agent, or Firm* — Bacon & Thomas, PLLC

(57) ABSTRACT

A flush valve, a dust collector provided with such a flush valve and a dust collection system, are disclosed. The flush valve includes a valve body and a valve spool. The valve body is internally provided with a fluid passageway. The valve body is provided with an inlet, a first outlet and a second outlet. The first outlet is fluidly connected to a device to be flushed. The valve spool includes a movable part, a fixed part and an elastic part, the fixed part being provided in the valve body, and the elastic part elastically connecting said fixed part to the movable part. One end of the movable part being provided with a first spool land for blocking the first outlet. The first spool land being configured to be pushed away from said first outlet by fluid in the fluid passageway when the pressure drops due to blockage.

13 Claims, 2 Drawing Sheets

(51) Int. Cl.
*B23Q 11/00* (2006.01)
*B01D 46/44* (2006.01)
*F16K 11/048* (2006.01)
*B01D 46/71* (2022.01)
*B01D 35/157* (2006.01)

(52) U.S. Cl.
CPC ............ B01D 46/71 (2022.01); F16K 11/048 (2013.01); *B01D 2279/00* (2013.01); *F16K 3/28* (2013.01)

(58) Field of Classification Search
CPC .............. B01D 35/157; B01D 35/1573; B01D 2279/00; F16K 11/04; F16K 11/048; F16K 3/246; F16K 17/065; F16K 27/0263; F16K 3/22; F16K 3/28; F16K 31/363; A47L 7/0095; A47L 9/20; B23Q 11/0071; B23Q 11/00; B23Q 11/0046; B23Q 11/0057; B08B 15/00; B25D 59/006; B24B 55/06

See application file for complete search history.

(56) References Cited

U.S. PATENT DOCUMENTS

| | | | |
|---|---|---|---|
| 3,229,816 A * | 1/1966 | Rosaen | B01D 35/153 137/599.05 |
| 3,638,737 A | 2/1972 | Moates | |
| 3,910,360 A | 10/1975 | Sundstrom | |
| 4,058,379 A | 11/1977 | Cheng | |
| 4,099,937 A | 7/1978 | Ufken et al. | |
| 4,353,722 A | 10/1982 | Berz | |
| 2004/0050369 A1* | 3/2004 | Feucht | F02M 37/0047 123/502 |
| 2010/0320000 A1 | 12/2010 | Sormunen | |

* cited by examiner

FLUSH VALVE, DUST COLLECTOR AND DUST COLLECTION SYSTEM

FIELD

The present invention relates to the field of breaking and drilling tools, particularly to a flush valve, a dust collector and a dust collection system.

BACKGROUND

In the related art, when workers use breakers, hammers, rock drills and other demolition tools for drilling operations, a large amount of dust, such as silica powder, will be generated during drilling. Workers exposed to a large amount of dust will easily inhale dust, seriously affecting the health of workers' lungs. Therefore, it is necessary to design a device to separate and store dust generated during breaking, chipping, drilling and other demolition operations in time to provide health protection for workers.

The existing dust collecting devices generate suction through devices such as orifices and venturi to suck, filter and store dust generated during demolition operation. The dust carrying air near the tip of the tool is sucked in and carried to the dust colleting device. In this dust collecting device, the air passes through a filter which separates the dust from the air. The dust is thus separated and stored in a dust collecting device bag. The clean air passing through the filter is exhausted back into the atmosphere, typically via a silencer. However, after long-term usage, the filter gets clogged which leads to a reduction in suction capacity of the dust collecting device. In such instance, it is necessary to clean and dedust the filter part. Currently, the flush valve is opened by manually controlling the gate to realize flushing of the filter part. A disadvantage is that someone needs to actively monitor the condition of the filter part and needs to manipulate it to clean it, which is inconvenient.

SUMMARY OF THE INVENTION

The present disclosure seeks to solve at least one of the problems existing in the related art to at least some extent. According to a first aspect of the present invention, a flush valve is provided which allows to make the flushing of the filter part of the dust collector more convenient.

According to a second aspect, the present invention also provides for a dust collector having a flush valve.

The invention also relates to a dust collection system having a dust collector.

The flush valve according to the first aspect of the present invention, comprises a valve body and a valve spool, wherein the valve body is internally provided with a fluid passageway, the valve body is provided with a communication port adapted to fluidly connect the fluid passageway with a filtered space in a filter part of a dust collector, said dust collector being provided with a negative pressure generating part for generating negative pressure to absorb dust in the filtered space, the valve spool is adapted to close the communication port, and the valve spool is adapted to open the communication port under the action of the resulting force which is the combination of the force induced by the negative pressure generated by the negative pressure generating part, on the one hand, and a spring force, on the other hand, when the filter part is blocked, so that the airflow in the fluid passageway flushes the filter part through the communication port.

According to the flush valve of the first aspect of the present disclosure, when the device to be flushed is blocked, the first outlet can be automatically opened for flushing the device to be flushed, as a result no monitoring of the blocking condition of the device to be flushed is required and there is also no need to operate the flush valve, so the flushing operation of the device to be flushed is very convenient.

Furthermore, the movable part is also provided with a second spool land, wherein the second spool land is adapted to block a second outlet when the first spool land opens a second channel.

Optionally, an installation cavity is arranged in the valve body, wherein the installation cavity and the fluid passageway are arranged at intervals, and the fixed part is provided in the installation cavity.

The dust collector according to the second aspect of the present disclosure, comprises a Venturi negative pressure generating part configured to generate negative pressure through Venturi effect; a dust collection part configured to collect dust through the negative pressure generated by the Venturi negative pressure generating part; a filter part forming the device to be flushed, wherein the filter part is arranged between the dust collection part and the Venturi negative pressure part, and the flush valve according to the first aspect of the present disclosure, wherein the second outlet of the flush valve is adapted to communicate with the Venturi negative pressure generating part, and the first outlet of the flush valve is adapted to communicate with the filter part.

According to the dust collection system in the second aspect of the present disclosure, the cleaning operation of the filter part is convenient, and the dust collection system is pressure-driven, thus avoiding electromagnetic radiation to nearby workers and improving the health protection of workers.

Further, the dust collector is connected with an air source through an inlet of a flush valve, and the Venturi negative pressure generating part comprises a Venturi tube, the second outlet being adapted to communicate with the Venturi tube.

Further, the dust collector further comprises a second air delivery pipe, wherein the second air delivery pipe is connected to the second outlet, and a spray head of the second air delivery pipe is adapted to extend into a nozzle of the Venturi tube.

Further, the Venturi tube is provided with an air delivery pipe mounting hole and an air flow collection area, the air delivery pipe mounting hole is used for penetrating the second air delivery pipe, and the air flow collection area is used for collecting airflow from the dust collection part.

Further, the air delivery pipe mounting hole and the air flow collection area are both positioned at the same axial end of the Venturi tube, and a pipe mounting ring is arranged between the air delivery pipe mounting hole and the second air delivery pipe.

Optionally, the dust collection part comprises a housing, wherein the Venturi tube and the filter part are both mounted in the housing, and a dust collection space is formed in the part outside the filter part in the housing.

Further, a gas collection device is arranged outside the housing, the gas collection device is communicated with the Venturi negative pressure generating part, and a vacuum gauge for measuring the air pressure of the filtered space is also arranged outside the housing.

Further, a dust carrying arrangement is detachably mounted below the housing, wherein the dust collector is communicated with the dust collection space; an extendable leg is arranged outside the housing, wherein the leg is adapted to elevate and support the housing to form a space suitable for mounting the dust carrying arrangement at least partially underneath said housing.

Further, a sliding supports which can extend downwards out of the housing is arranged in the housing, and the sliding supports which extends out of the housing is adapted to support the dust collector.

The dust collection system according to the third aspect of the present disclosure comprises a dust suction hood, a connecting pipe and a dust collector according to the second aspect of the present disclosure, wherein the connecting pipe is connected between the dust suction hood and the dust collector.

According to the dust collection system in the third aspect of the present disclosure, the cleaning operation of the filter part is convenient, and the dust collection system is pressure-driven, thus avoiding electromagnetic radiation to nearby workers and improving the health protection of workers.

Additional aspects and advantages of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of the present disclosure will become apparent and easy to understand from descriptions of the embodiments with reference to the drawings, in which.

REFERENCE NUMBERS

Figure 1:
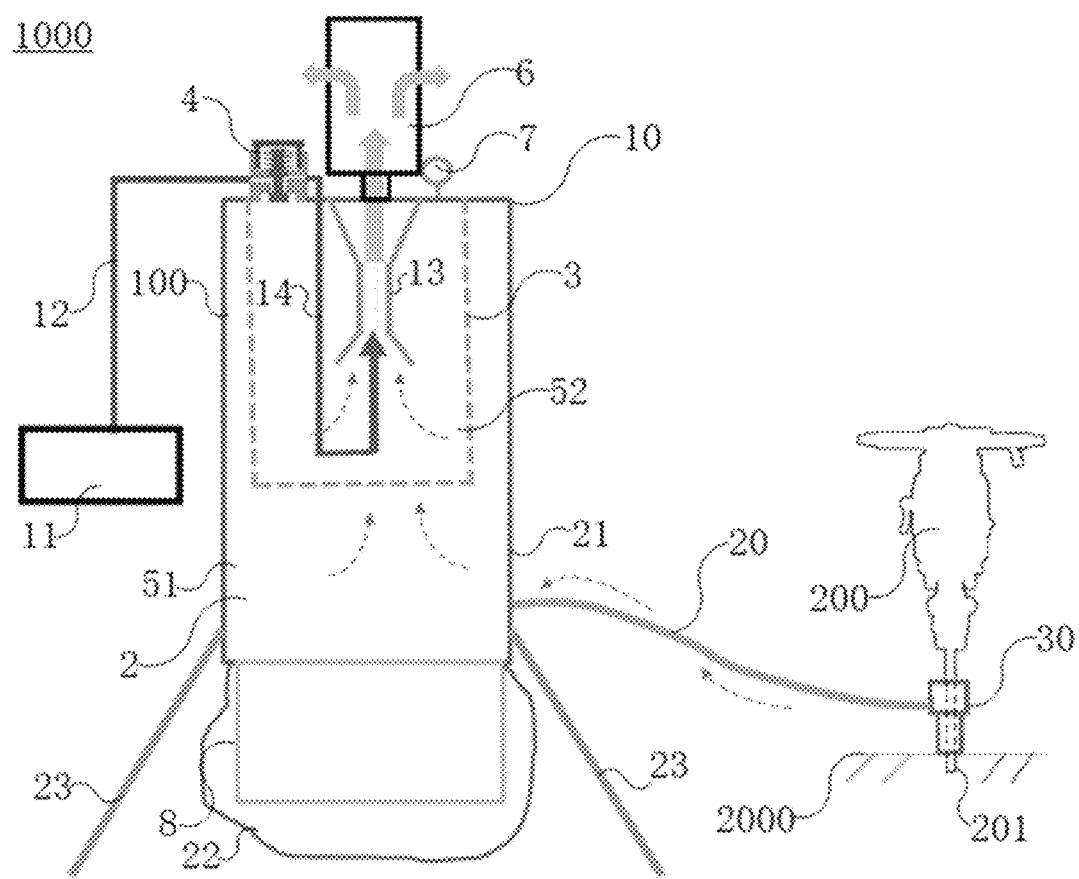
FIG. 1 schematically represents a drilling tool connected to a dust collector according to one embodiment of the present invention.

Drilling tool 200, dust collection system 100, air source 11, first air delivery pipe 12, Venturi negative pressure generating part 13, Venturi air delivery pipe mounting hole 131, airflow collection area 132, pipe mounting ring 133, second air delivery pipe 14, spray head 141 with nozzle, dust collection part 2, housing 21, dust carrying arrangement 22, legs 23, filter part 3, flush valve 4, valve body 41, inlet 411, second outlet 412, first outlet 413, fluid passageway 414, valve spool 42, fixed part 421, elastic part 422, movable part 423, first spool land 424, second spool land 425, valve cover 43, Vent V, installation cavity 44, dust collection space 51, filtered space 52, gas collection device 6, vacuum gauge 7, sliding support 8, dust collector 10, connecting pipe 20, dust hood 30, drilling tool 200, work tool 201 (e.g. drill head), flushing air supply pipe 40, flushing air ring 45, working surface 2000.

Although in the present disclosure, the tool is referred to as a drilling tool 200, it should be clear that this wording equally includes a tool which can be used for drilling, breaking, chipping and/or other demolition activities.

DETAILED DESCRIPTION OF THE INVENTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In the specification, it is to be understood that terms such as "upper", "lower", "inner", "outer" and the like should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

The present disclosure will be described below with reference to specific embodiments in conjunction with the drawings.

First, a flush valve 4 according to an embodiment of the present disclosure will be described below with reference to FIGS. 1 and 3.

Figure 3:
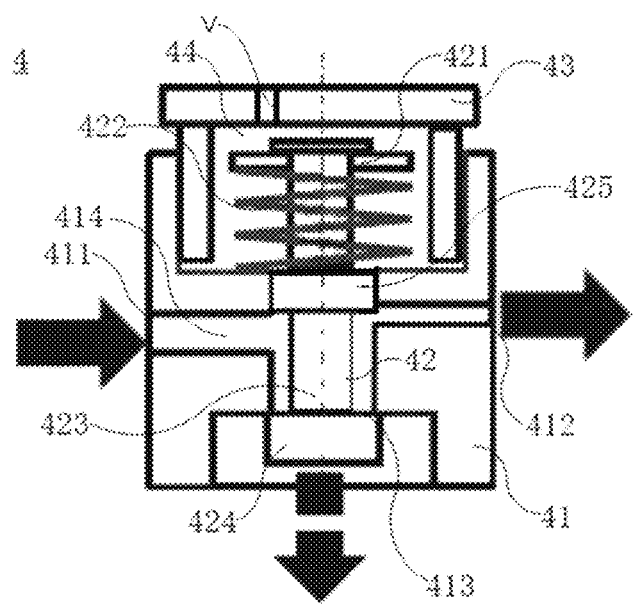
FIG. 3 schematically represents a flush valve according to one embodiment of the present invention.

As shown in FIGS. 1 and 3, the flush valve 4 according to an embodiment of the present disclosure may include a valve body 41 and a valve spool 42, wherein the valve body 41 has a fluid passageway 414 through which a fluid (e.g., including but not limited to gas and/or liquid) may flow.

As shown in FIGS. 1 and 3, the valve body 41 has an inlet 411, a second outlet 412, and a first outlet 413, wherein the first outlet is suitable for being connected to the device to be flushed. The valve spool 42 comprises a movable part 423, a fixed part 421 and an elastic part 422, wherein the fixed part 421 is fixed in the valve spool 42 the elastic part 422 is elastically connected between the fixed part 421 and the valve body 41, and one end of the movable part 423 is provided with the first spool land 424 for blocking the first outlet 413.

When the device to be flushed works normally, the first spool land blocks the first outlet 413 to prevent the fluid in the fluid passageway 414 from flowing into the device to be flushed through the first outlet 413.

When the device to be flushed is blocked and needs flushing, the pressure of the device to be flushed drops due to the blockage, thus generating a pressure difference between the installation cavity and the device to be flushed. The pressure difference causes the first spool land 424 to move away from first outlet 413 to open the first outlet 413. At this time, the fluid in the fluid passageway 414 flows to the device to be flushed through the first outlet 413 to flush the device to be flushed.

As a result, the flush valve 4 can automatically open the first outlet 413 for flushing the device to be flushed when the device to be flushed is blocked, nobody is required to monitor the blocking condition of the device to be flushed, nobody is required to operate the flush valve, and the flushing operation of the device to be flushed is convenient.

As shown in FIG. 3, the valve spool 42 comprises a movable part 423, a fixed part 421 and an elastic part 422. The movable part 423 can move in the valve body 41 under the action of an external force. The movable part 423 is provided with a first spool land 424, which blocks the first outlet 413 when the device to be flushed is normally filtered. The elastic part 422 between valve body 41 and the fixed part 421, and the spring load acts on the valve spool 42, which is restricted by the valve body 41, against first spool land 424.

As shown in FIG. 3, the fixed part 421 is a part of valve spool 42, and the elastic part 422 is elastically connected between the fixed part 421 and the valve body 41. When the air pressure of the device to be flushed drops due to blockage, the movable part 423 moves in the direction of the device to be flushed (e.g., downward direction in FIG. 3) under the pressure difference between the device to be flushed and the installation cavity 44, and the elastic part 422 is compressed at this time to store elastic potential energy. However, after the flushing of the device to be flushed is completed and normal operation is resumed, after the pressure of the device to be flushed and the installation cavity 44 is balanced, the elastic part 422 releases the elastic potential energy to return to the original length, so that the first spool land 424 blocks the first outlet 413 again. Therefore, after the device to be flushed is flushed, the valve spool 42 can automatically re-block the first outlet 413, and the operation is convenient.

In addition, due to the elastic action of the elastic part 422, when the pressure of the device to be flushed drops due to blockage, the movable part 423 moves in the direction of the device to be flushed under the pressure difference between the device to be flushed and the installation cavity 44, so that the first outlet 413 is opened, the airflow in the valve body 41 flows to the device to be flushed, the device to be flushed is pressurized while the device to be flushed is flushed, and when the first outlet 413 is opened for a short time, the device to be flushed is not unblocked yet. Due to the pressure supplementing effect of the airflow in the valve body 41, the device to be flushed and the valve body 41 realize a temporary pressure balance (or the pressure difference between the device to be flushed and the installation cavity 44 is not sufficient to push the first spool land 424 away from the first outlet 413), and at this time, the elastic part 422 releases elastic potential energy to cause the first spool land 424 to re-block the first outlet 413.

However, since the device to be flushed is not unblocked at this time, the air pressure in the device to be flushed will continuously decrease due to the continuous negative pressure adsorption effect of the negative pressure generating part 13. When the air pressure in the device to be flushed decreases to a certain extent, the movable part 423 will move toward the device to be flushed again under the pressure difference between the device to be flushed and the installation cavity 44, so that the first outlet 413 is opened again, and the fluid in the valve body 41 flows to the device to be flushed again and flushes the device to be flushed. From this, it can be seen that when the device to be flushed is blocked, the first spool land 424 will be opened many times, and many times of pressure kick will occur in the device to be flushed, thus the flushing effect of the device to be flushed can be improved, and the device to be flushed can be unblocked.

Specifically, as shown in FIG. 3, the movable part 423 is further provided with a second spool land 425, wherein the second spool land 425 is adapted to block the second outlet 412 when the movable part 423 opens the first outlet 413 to prevent fluid in the second outlet 412 from being diverted. It should be noted that at this time, the second spool land 425 does not block the flow of fluid from the fluid passageway 414 to the first outlet 413. Therefore, when the fluid in the fluid passageway 414 flushes the device to be flushed through the first outlet 413, partial fluid diversion can be avoided, so that the fluid flow for flushing the device to be flushed is large, and the flushing effect of the fluid to the device to be flushed is ensured.

More specifically, as shown in FIG. 3, the second spool land 425 and the first spool land 424 are fixed on the movable part 423 at an axial interval of the movable part 423, so that the second spool land 425 and the first spool land 424 can be interlocked, that is, when the first spool land 424 blocks the first outlet 413, the second spool land 425 does not close off the second outlet 412 enabling fluid diversion therethrough, to create vacuum inside the filtered space 52. When the first spool land 424 leaves the first outlet 413, the second spool land 425 blocks the second outlet 412 to ensure fluid diversion in the first outlet 413, to flush the dust from filter part 3.

Specifically, as shown in FIG. 3, the fixed part 421 is a part of or rigidly connected to movable part 423 and valve body 41. The fixed part 421 has a first flange at one end which supports elastic part 422. The elastic part 422 is guided over fixed part 421 and supported on valve body 41 on the other end. The valve body 41 is also provided with an installation cavity 44 spaced apart from the fluid passageway 414. The fixed part 421 is located in the installation cavity 44, so as to prevent the fixed part 421 from blocking the fluid passageway to ensure the smooth flow of fluid in the fluid passageway 414. At the same time, the installation cavity 44 is separated from the fluid passageway 414 via an annular sealing between the second spool land 425 and a hole in valve body 41, and the movable part 423 can extend into the fluid passageway 414 from the installation cavity 44 to block the first outlet 413.

Specifically, as shown in FIG. 3, the installation cavity 44 has an opening communicating with the outside of the valve body 41, and the valve body 41 is further provided with a valve cover 43 at the opening of the installation cavity 44. When assembling and disassembling the valve spool 42, the valve cover 43 can be opened to operate the valve spool 42 from the opening of the installation cavity 44, and the valve spool 42 is convenient to assemble and disassemble. When the valve spool 42 is installed, the valve cover 43 can seal the opening of the installation cavity 44. Valve cover 43 has a vent V provided in it to ensure atmospheric pressure inside the installation cavity 44. The clearance between the circumferential edge of the second spool land 425 and the inner diameter of the hole in the valve body 41 is kept as small as possible to prevent the fluid entrance into the installation cavity 44 while ensuring freedom of sliding motion.

A dust collector 10 according to an embodiment of the present disclosure will be described with reference to FIGS. 1 to 3.

Figure 2:
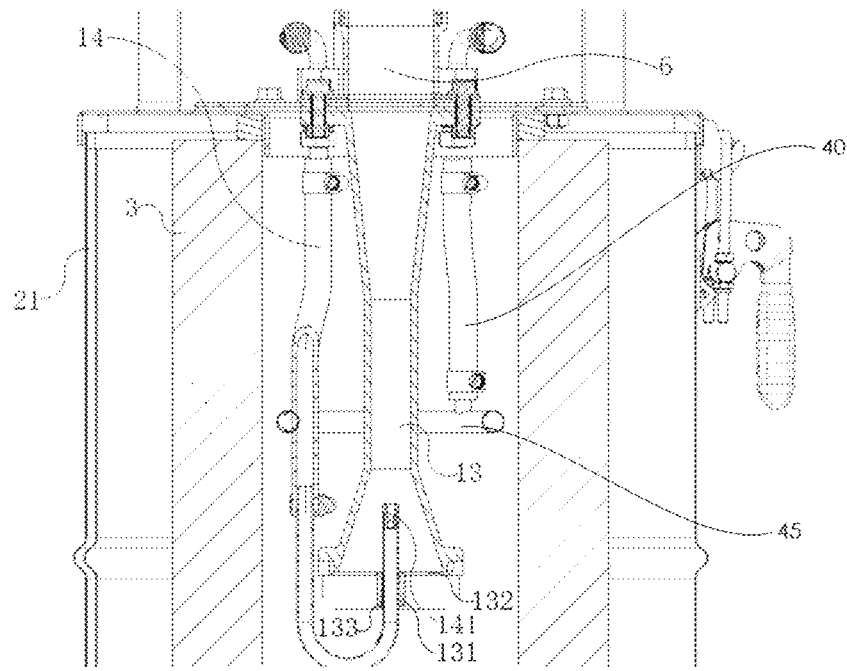
FIG. 2 is an installation instruction illustrating a Venturi negative pressure generating part, a housing and a filter part according to embodiments of the present disclosure.

As shown in FIGS. 1 to 3, the dust collector 10 according to an embodiment of the present disclosure may include a Venturi negative pressure generating part 13, a dust collecting part 2, a filter part 3 according to any of the above embodiments, and a flush valve 4 according to any of the above embodiments. The Venturi negative pressure generating part 13 is the negative pressure generating part 13 in any of the above embodiments. The Venturi negative pressure generating part 13 is used for generating negative pressure through the Venturi effect, that is, by providing a structure having a suddenly reduced flow cross section (including but not limited to a Venturi tube), the fluid flowing at a high speed generates a Venturi effect (that is, the fluid flow rate increases and the pressure decreases) at the flow cross section flowing to the suddenly reduced flow cross section to generate a low pressure. Therefore, the pressure at the Venturi negative pressure generating part 13 is smaller than the outside atmospheric pressure, and an airflow flowing from the outside to the Venturi negative pressure generating part 13 is formed under the pressure difference between the outside atmospheric pressure and the Venturi negative pressure generating part 13, and the airflow can carry outside dust, thereby realizing the absorption of the outside dust.

As shown in FIGS. 1 to 2, the Venturi negative pressure generating part 13 is communicated with the dust collection part 2, so that the negative pressure absorbing effect generated by the Venturi negative pressure generating part 13 can provide an absorbing power source for the dust collection part 2, that is, dust generated in projects such as drilling, chipping, cutting, breaking and demolishing operations and the like can be sucked into the dust collection part 2 through the negative pressure provided by the Venturi negative pressure generating part 13 to be collected, thus preventing dust from leaking to the outside atmosphere to be inhaled by workers and ensuring the health of workers.

As shown in FIG. 1, the filter part 3 is arranged between the Venturi negative pressure generating part 13 and the dust collection part 2. The filter part 3 is used to isolate the dust collected by the dust collection part 2 from the Venturi negative pressure generating part 13. In other words, the airflow generated under the difference between the negative pressure generated by the Venturi negative pressure generating part 13 and the external atmospheric pressure passes through the filter part 3 during the process of flowing to the Venturi negative pressure generating part 13. At this time, the airflow will continue to flow to the Venturi negative pressure generating part 13 after passing through the filter part 3, and impurities such as dust carried in the airflow will be adsorbed by the filter part 3 or blocked in the dust collection part 2 by the filter part 3. As a result, the filter part 3 can prevent dust sucked by the dust collection part 2 from entering the Venturi negative pressure generating part 13, causing the Venturi negative pressure generating part 13 to block and unable to generate negative pressure, thereby ensuring that dust generated during operation is smoothly sucked into the dust collection part 2.

After the filter part 3 is used for a long time, the surface of the filter part 3 will be blocked due to the absorption of more dust, and airflow cannot be sucked into the negative pressure generating part through the filter part 3, resulting in the dust carrying arrangement 22 losing the power source from the negative pressure generating part 13, and the dust carrying arrangement 22 cannot continue to absorb and filter dust. At this time, the filter part 3 is the device to be flushed according to the above embodiment.

In order for the dust carrying arrangement 22 to regain the ability to absorb dust, it is necessary to perform dust removal operation on the filter part 3 so that the filter part 3 can regain the ability to pass through the airflow. At this time, the filter part 3 is blocked and cannot pass through the airflow. The continuous negative pressure adsorption effect of the negative pressure generating part in the filtered space 52 causes the air pressure in the filtered space 52 to continuously decrease. When the air pressure in the filtered space 52 drops below a certain extent, the pressure in installation cavity 44 overcomes the force exerted by elastic part 422 leading to movement of valve spool 42 in the direction of the filtered space 52. This motion towards the filtered space 52 opens the first outlet 413, and then the airflow flowing in the fluid passageway 414 flows from the first outlet 413 to the filtered space 52 to flush the dust adsorbed by the filter part 3. Therefore, the opening of the valve spool 42 can be realized without manual movement of a human body or additional components for moving the valve spool 42, so that flushing of the filter part 3 is realized, and flushing and cleaning of the filter part 3 are more convenient.

Specifically, as shown in FIG. 3, the valve spool 42 comprises a movable part 423, the first spool land 424, the second spool land 425, fixed part 421 and an elastic part 422. The valve spool can move in the valve body 41 under the action of external force. The first spool land 424 blocks the first outlet 413 when the device to be flushed is normally filtered.

As shown in FIG. 3, the fixed part 421 is fixed in the valve body 41, and the elastic part 422 is elastically connected between the fixed part 421 and the movable part 423. When the filter part 3 cannot pass through the airflow due to blockage, the movable part 423 moves in the direction (e.g., downward direction in FIG. 3) of the filtered space 52 under the pressure difference between the filtered space 52 and the valve body 41, and the elastic part 422 is stretched at this time to store elastic potential energy. However, after the filter part 3 is flushed and normal filtration is realized again, and the pressure of the filtered space 52 and the valve body 41 is balanced, the elastic part 422 releases the elastic potential energy to return to the original length, so that the first spool land 424 blocks the first outlet 413 again. Therefore, after the filter part 3 is flushed, the valve spool 42 can automatically re-block the first outlet 413, and the operation is convenient.

In addition, due to the elastic action of the elastic part 422, when the filter part 3 cannot pass through the airflow due to blockage, the movable part 423 moves in the direction of the filtered space 52 under the pressure difference between the filtered space 52 and the valve body 41, so that the first outlet 413 is opened, the airflow in the valve body 41 flows to the filtered space 52, the filtered space 52 is pressurized while the filter part 3 is flushed, and when the first outlet 413 is opened for a short time, the filter part 3 is not unblocked yet. Due to the pressure supplementing effect of the airflow in the valve body 41, the filtered space 52 and the valve body 41 realize a temporary pressure balance, and at this time, the elastic part 422 releases elastic potential energy to cause the first spool land 424 to re-block the first outlet 413.

However, since the filter part 3 is not unblocked at this time, the air pressure in the filtered space 52 will continuously decrease due to the continuous negative pressure adsorption effect of the negative pressure generating part 13. When the air pressure in the filtered space 52 decreases to a certain extent, the movable part 423 moves toward the filtered space 52 again under the pressure difference between the filtered space 52 and the valve body 41, so that the first outlet 413 is opened again, and the airflow in the valve body 41 flows to the filtered space 52 again and flushes filter part 3. From this, it can be seen that when the filter part 3 is blocked, the second spool land 425, which is adapted to be blocked in the fluid passageway 414 when the movable part 423 opens the first outlet 413 to prevent the airflow in the fluid passageway 414 from flowing to the negative pressure generating part 13. It should be noted that at this time, the second spool land will be opened many times, and many times of pressure kick will occur in the filtered space 52, thus the flushing effect of the filter part 3 can be improved, and the filter part 3 can be unblocked.

Specifically, as shown in FIG. 3, the movable part 423 is also provided with the second spool land 425, which is adapted to be blocked in the fluid passageway 414 when the movable part 423 opens the first outlet 413 to prevent the airflow in the fluid passageway 414 from flowing to the negative pressure generating part 13. It should be noted that at this time, the second spool land 425 does not significantly block the airflow from the fluid passageway 414 to the first outlet 413. Therefore, it is possible to prevent part of the airflow from flowing to the venturi negative pressure generating part 13 when the airflow in the fluid passageway 414 flushes the filter part 3 through the first outlet 413, so that the airflow for flushing the filter part 3 is large, and the flushing effect of the airflow to the filter part 3 is ensured.

More specifically, as shown in FIG. 3, the second spool land 425 and the first spool land 424 are fixed on the movable part 423 at an axial interval of the movable part 423, so that the second spool land 425 and the first spool land 424 can be interlocked, that is, when the first spool land 424 blocks the first outlet 413, the second spool land 425 avoids the fluid passageway 414 to ensure that the airflow in the fluid passageway 414 flows to the negative pressure generating part 13, so that the venturi negative pressure generating part 13 generates negative pressure. When the first spool land 424 leaves the first outlet 413, the second spool land 425 is blocked in the fluid passageway 414 to block the airflow of the fluid passageway 414 from flowing to the venturi negative pressure generating part 13 and allow more airflow to pass through the first outlet 413 to flush the filter part 3.

In addition, since the Venturi negative pressure generating part 13 drives the dust collection part 2 to suck dust in a pneumatic way, the noise generated of this method is relatively small, and electromagnetic radiation is not generated at the same time compared with directly sucking dust by electric means such as an electric air extractor, thus improving the health protection of workers near the dust collector 10.

As shown in FIG. 1, the flush valve 4 is adapted to communicate with the Venturi negative pressure generating part 13, and airflow can continue to flow into the Venturi negative pressure generating part 13 to generate negative pressure after flowing through the fluid passageway 414 of the flush valve 4. However, when the filter part 3 is blocked, at least part of the airflow in the fluid passageway 414 originally flowing to the Venturi negative pressure generating part 13 can enter the filtered space 52 through the first outlet 413 to realize flushing of the filter part 3. At the same time, the flush valve 4 can automatically communicate with the filtered space 52 when the filtering part is blocked to carry out the flushing operation of the filtering part 3, and the flushing operation of the filtering part 3 is convenient.

In some alternative embodiments of the present disclosure, as shown in FIG. 1, the dust collector 10 further comprises an air source 11 and a first air delivery pipe 12. The venturi negative pressure generating part 13 comprises a Venturi pipe. The air source 11 can be either a gas storage device that provides a limited amount of gas for a gas cylinder or the like, or a pressurizing device such as a compressor that pressurizes the airflow. The air of the air source 11 is delivered to the Venturi tube through the first air delivery pipe 12, and when passing through the Venturi tube, a Venturi effect is generated to reduce the airflow pressure, so that the airflow pressure at the Venturi tube is less than the ambient atmospheric pressure.

As shown in FIGS. 1 and 3, the valve body 41 has an inlet 411 and a second outlet 412, wherein the inlet 411 and the second outlet 412 are both in communication with the fluid passageway 414, the first air delivery pipe 12 is connected between the air source 11 and the inlet 411, the second outlet 412 is in communication with the Venturi tube, the first outlet 413 is in communication with the filtered space 52 inside the filter part 3, and the valve spool 42 is used to selectively communicate the inlet 411 with the first outlet 413. The venturi is located in the filtered space 52 to prevent dust from entering the Venturi tube.

When the filter part 3 is normally filtered and the airflow can normally flow from the dust collection part 2 through the filter part 3 into the Venturi negative pressure generating part 13, the valve spool 42 blocks the first outlet 413, and the air in the air source 11 cannot flow out of the valve body 41 through the first outlet 413 and can only flow into the Venturi tube from the second outlet 412 after entering the fluid passageway 414 from the inlet 411 through the first air delivery pipe 12. As a result, the velocity of flow into the Venturi tube can be made faster and a strong negative pressure can be formed in the Venturi tube. In some specific embodiments, the Venturi tube may have a tubular shape with openings at both ends having an area larger than the flow-through area of the middle portion, whereby the pressure of the airflow flowing into the middle portion of the Venturi tube is reduced to below the ambient atmospheric pressure, so that the ambient airflow flows into the Venturi tube from the dust collection part 2 through the filter part 3 under the action of the pressure difference.

Optionally, as shown in FIG. 2, the dust collector 10 further includes a second air delivery pipe 14 connected to a second outlet 412, and a spray head 141 of the second air delivery pipe 14 is adapted to extend into the nozzle of the Venturi tube. Therefore, it can be ensured that an airflow flowing out of the air source 11 flows into the second air delivery pipe 14 after sequentially passing through the first air delivery pipe 12 and the flush valve 4, and flows into the Venturi tube from the spray head 141 of the second air delivery pipe 14. At the same time, another airflow (i.e., airflow carrying dust) generated by the external atmosphere under the action of the Venturi negative pressure generating part 13 flows into the Venturi tube after being filtered by the dust collection part 2 through the filter part 3. Since the spray head 141 of the second air delivery pipe penetrates into the Venturi tube, it can be ensured that the above two airflows will not generate turbulence outside the Venturi tube when flowing into the Venturi tube, thus ensuring smooth flow of the airflow into the Venturi tube.

Specifically, as shown in FIG. 2, the Venturi air delivery pipe mounting hole 131 and an airflow collection area 132 which may include at least one regular or irregular ventilation passage. The Venturi air delivery pipe mounting hole 131 is used for penetrating the second air delivery pipe 14. The low pressure generated near the airflow collection area 132 under the Venturi effect promotes the airflow to flow into the Venturi tube. The spray head of the second air delivery pipe 14 penetrates into the Venturi air delivery pipe mounting hole 131. The airflow collection area 132 is used for collecting the airflow from the dust collection part 2. Therefore, the Venturi air delivery pipe mounting hole 131 and the airflow collection area 132 can further ensure that the airflow from the second air delivery pipe 14 and the airflow from the dust collection part 2 are separated at the time of entering the Venturi tube, thereby further avoiding turbulence between the two streams of airflow and ensuring the negative pressure generation effect of the Venturi tube.

Specifically, as shown in FIG. 2, the Venturi air delivery pipe mounting hole 131 and the airflow collection area 132 are both located at the same axial end of the Venturi tube. A pipe mounting ring 133 is provided between the Venturi air delivery pipe mounting hole 131 and the second air delivery pipe 14. The pipe mounting ring 133 may be a mounting ring sleeved outside the Venturi air delivery pipe mounting hole 131 for mounting the second air delivery pipe 14, so as to prevent the airflow emitted from the second air delivery pipe 14 from leaking out of the Venturi air delivery pipe mounting hole 131 to the outside of the Venturi tube and from contacting with the gas flow outside the Venturi tube to generate turbulence. The airflow collection area 132 may be a plurality of and is arranged around the circumference of the Venturi air delivery pipe mounting hole 131 so that the airflow from the dust collection part 2 uniformly enters the Venturi tube.

Specifically, the filter part 3 may be a filter screen or filter element sleeved outside the Venturi tube.

Specifically, as shown in FIGS. 1 to 2, the dust collection part 2 includes a housing 21, at least the part of the Venturi negative pressure generating part 13 and the filter part 3 are installed in the housing 21, and a dust collection space 51 is formed in the part of the housing 21 outside the filter part 3. For example, the second air delivery pipe 14 may penetrate into the housing 21 and communicate with a Venturi tube in the housing 21. The filter part 3 houses the part of the second air delivery pipe 14 extending into the housing 21 and the Venturi tube, that is, the part of the second air delivery pipe 14 extending into the housing 21 and the Venturi tube are both located in the filtered space 52. As a result, both the filter part 3 and the Venturi negative pressure generating part 13 can work in the relatively closed housing 21, and the working reliability is strong.

Optionally, as shown in FIG. 1, the housing 21 is externally provided with a gas collection device 6, which is in communication with the Venturi negative pressure generating part 13. After flowing into the Venturi negative pressure generating part 13, the airflow flowing from the air source 11 into the Venturi negative pressure generating part 13 and the airflow flowing from the dust collection part 2 into the Venturi negative pressure generating part 13 further flow out of the housing 21 from the Venturi negative pressure generating part 13 and into the gas collection device 6 may be located at the top of the housing 21 to facilitate gas in the housing 21 to flow out of the gas collection device 6.

As shown in FIG. 1, a vacuum gauge 7 for measuring the air pressure in the filtered space 52 is also arranged outside the housing 21. As a result, personnel can conveniently check the condition of the filter part 3 through the vacuum gauge 7. When the reading of the vacuum gauge 7 decreases, it indicates that the filter part 3 has been blocked. When the reading of the vacuum gauge 7 is at a low position for a long time, it indicates that the dust blocked by the filter part 3 cannot be removed by the flush valve 4, and personnel can take other measures in time (e.g. replacing the filter part 3).

Optionally, as shown in FIG. 1, a dust carrying arrangement 22 is detachably installed below the housing 21, and the lower part of the housing 21 is opened so that the dust carrying arrangement 22 communicates with the dust collection space 51. The dust entering the dust collection space 51 settles and collects in the dust carrying arrangement 22 under the action of its own gravity. When the dust of the dust carrying arrangement 22 is fully collected, the dust carrying arrangement 22 can be disassembled and replaced with a new one. More specifically, the dust carrying arrangement 22 may be a plastic bag.

As shown in FIG. 1, the housing 21 is provided with extendable legs 23 adapted to extend and support the housing 21, and the legs 23 are hingedly rotatable with the housing 21. When the dust collector 10 is in operation, the legs 23 can be extended to support the housing 21 and form a space suitable for installing the dust carrying arrangement 22 under the housing 21. When the dust collector 10 is transported, the legs 23 can be retracted and brought together with the housing 21 to facilitate transportation. More specifically, the housing 21 is also provided with a sliding support 8 which can slide downward and unfold relative to the housing 21 to mount the dust carrying arrangement 22, which can be bound to the mounting bracket to facilitate the arrangement of the dust carrying arrangement 22. When the dust collector 10 is transported, the mounting bracket can be retracted to facilitate transportation.

In a further embodiment of a dust collector according to the invention as shown in FIG. 2, the dust collector includes a flushing air supply pipe 40 and a flushing air ring 45. The flushing air supply pipe 40 is in fluid communication with the first outlet 413 of the valve body 41 through an adapter pipe. The other end of the flushing air supply pipe 40 is connected to the flushing air ring 45 to distribute the high-pressured air circumferentially inside the filter space 52. The flushing air ring 45 has multiple circular holes through out a circumference of the ring.

The dust collection system 100 according to the embodiment of the present disclosure will be described below.

As shown in FIG. 1, a dust collection system 100 according to an embodiment of the present disclosure includes a dust hood 30, a connecting pipe 20 and the dust collector 10 according to any one of the above embodiments of the present disclosure. The connecting pipe 20 is connected between the dust hood 30 and the dust collector 10. When a drilling operation is performed, the dust collector 10 can absorb dust such as silica generated during drilling, chipping or breaking of a drilling tool 200 through the dust hood 30.

According to the dust collection system 100 of the embodiment of the disclosure, by arranging the dust collector 10, the washing operation of the filter part is convenient, dust generated by workers during drilling operation can be collected in the dust collecting system 100 in time, so that the workers are prevented from sucking the dust into the body. Meanwhile, the dust collecting system 100 is driven by pressure, so that electromagnetic radiation to nearby workers is avoided, and the health guarantee of the workers is improved.

The drilling tool 1000 according to the embodiment of the present disclosure will be described below.

As shown in FIG. 1, a drilling tool 1000 according to an embodiment of the present disclosure includes a drilling tool 200 and the dust collection system 100 according to the above embodiment of the present disclosure. The drilling tool 200 is adapted to penetrate through a dust hood 30, the drilling tool 200 drills a working surface 2000 (e.g., the ground) through a work tool 201, and the dust hood 30 is located at the work tool 201 of the drilling tool 200, so that the dust hood 30 can effectively absorb dust such as drill cuttings generated by the working surface 2000, prevent dust from leaking to the outside atmosphere, and ensure the health of workers.

Specifically, the housing 21 is externally provided with a flow divider, and the air source 11 is connected with the flow divider. A part of the airflow flowing out of the air source 11 flows to the Venturi tube through the flow divider to generate negative pressure to adsorb dust, and another part of the airflow flowing out of the air source 11 flows to the drilling tool 200 through the flow divider to provide starting power for the drilling tool 200, so that the drilling tool 200 is pressure driven, electromagnetic radiation to nearby workers is avoided, and health protection of the workers is improved.

In addition, according to the drilling tool 1000 of the embodiment of the present disclosure, the flushing operation of the filter part 3 is convenient, dust generated by workers during drilling operation through the drilling tool 1000 can be collected in the dust collection system 100 in time, so that the workers are prevented from sucking the dust into the body. Meanwhile, the dust collecting system 100 is driven by pressure, so that electromagnetic radiation to nearby workers is avoided, and the health guarantee of the workers is improved.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from the scope of the present disclosure.

What is claimed is:

1. A flush valve for use in a dust collector, said flush valve comprising:
    a valve body, and
    a valve spool, wherein the valve body is internally provided with a fluid passageway, and the valve body is provided with an inlet, a first outlet and a second outlet, wherein said fluid passageway fluidly connects said inlet to said first and second outlets, and whereby said first outlet is adapted to be fluidly connected with a device to be flushed,
    said valve spool comprising a movable part, a fixed part and an elastic part, wherein the fixed part is provided in the valve body, wherein the elastic part is elastically connected between the fixed part and the movable part, wherein one end of the movable part is provided with a first spool land for blocking said first outlet, and
    said first spool land being configured to be pushed away from said first outlet by a fluid in said fluid passageway to enable flushing said device to be flushed when the pressure of said device to be flushed drops due to blockage.
2. The flush valve according to claim 1, wherein said movable part is further provided with a second spool land, said second spool land being configured to block said second outlet when said first spool land does not close off said first outlet.
3. The flush valve according to claim 1, wherein an installation cavity is arranged in the valve body, said installation cavity and said fluid passageway being arranged at intervals, and said fixed part being provided inside said installation cavity.
4. A dust collector comprising:
    a Venturi negative pressure generating part configured to generate negative pressure through a Venturi effect,
    a dust collection part configured to collect dust through the negative pressure generated by said Venturi negative pressure generating part,
    a filter part constituting a device to be flushed, said filter part being arranged between said dust collection part and said Venturi negative pressure generating part to define a filtered space, and
    the flush valve according to claim 1, wherein the second outlet of said flush valve is fluidly connected to said the Venturi negative pressure generating part, and said first outlet of the flush valve is fluidly connected with said filter part.
5. The dust collector according to claim 4, wherein said dust collector is configured to be connected with an air source through said inlet of said flush valve, and said Venturi negative pressure generating part comprises a Venturi tube, and said second outlet is fluidly connected to said Venturi tube.
6. The dust collector according to claim 5, wherein said dust collector further comprises:
    a second air delivery pipe, said second air delivery pipe being fluidly connected to said second outlet, and
    a spray head of said second air delivery pipe being adapted to extend into a nozzle of said Venturi tube.
7. The dust collector according to claim 6, wherein said Venturi tube is provided with an air delivery pipe mounting hole and an airflow collection area, said air delivery pipe mounting hole being fluidly connected to said second air delivery pipe, and said airflow collection area being configured to collect airflow from said dust collection part.
8. The dust collector according to claim 7, wherein said air delivery pipe mounting hole and said airflow collection area are both positioned at the same axial end of said Venturi tube, and a pipe mounting ring is arranged between said air delivery pipe mounting hole and said second air delivery pipe.
9. The dust collector according to claim 5, wherein said dust collection part comprises a housing, said Venturi tube and said filter part both are mounted in said housing, and a dust collection space is formed inside said housing but outside said filter part.
10. The dust collector according to claim 9, wherein a gas collection device is arranged outside said housing, said gas collection device being fluidly connected to said Venturi negative pressure generating part, said dust collector further comprising a vacuum gauge outside said housing for measuring the air pressure of the filtered space.
11. The dust collector according to claim 9, wherein a dust carrying arrangement is configured to be detachably mounted below the housing, the dust carrying arrangement being in fluid communication with said dust collection space, and wherein extendable legs are arranged outside said housing, said legs being adapted to elevate and support said housing to form a space suitable for mounting said dust carrying arrangement at least partially underneath said housing.

12. The dust collector according to claim 11, wherein a sliding support is provided which is configured to extend downwards out of the housing, said sliding support being adapted to support said housing.

13. A dust collection system, comprising a dust hood, a connecting pipe and the dust collector according to claim 4, wherein the connecting pipe is connected between the dust hood and the dust collector.

* * * * *

UNITED STATES PATENT AND TRADEMARK OFFICE
CERTIFICATE OF CORRECTION

PATENT NO. : 11,458,430 B2
APPLICATION NO. : 17/037801
DATED : October 4, 2022
INVENTOR(S) : Prashant K. Rajput et al.

Page 1 of 1

It is certified that error appears in the above-identified patent and that said Letters Patent is hereby corrected as shown below:

On the Title Page

The name of the Assignee:
ATLAS COPCO AIRPOWER, NAAMLOOZE VENNOOTSCHAP
Should be replaced with the following:
ATLAS COPCO AIRPOWER, NAAMLOZE VENNOOTSCHAP.

Signed and Sealed this
Third Day of January, 2023

Katherine Kelly Vidal
*Director of the United States Patent and Trademark Office*